United States Patent
Lien et al.

(10) Patent No.: US 8,047,480 B2
(45) Date of Patent: Nov. 1, 2011

(54) FLAT PANEL DISPLAY HAVING HEIGHT ADJUSTING MEMBER

(75) Inventors: Chih-Huang Lien, Miao-Li (TW); Zhou Zhou, Shenzhen (CH); Shi-Liang Li, Shenzhen (CH)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 770 days.

(21) Appl. No.: 12/080,004

(22) Filed: Mar. 31, 2008

(65) Prior Publication Data

US 2008/0237414 A1    Oct. 2, 2008

(30) Foreign Application Priority Data

Mar. 30, 2007  (CN) ........................... 2007 1 0073755

(51) Int. Cl.
*F16M 11/00* (2006.01)
(52) U.S. Cl. ...................... 248/162.1; 248/917; 248/618
(58) Field of Classification Search .................. 248/161, 248/162.1, 404, 412, 414, 157, 917, 918; 361/679.02, 679.21, 679.05, 679.08, 679.61
See application file for complete search history.

(56) References Cited

U.S. PATENT DOCUMENTS

| | | | | |
|---|---|---|---|---|
| 6,796,537 | B1 * | 9/2004 | Lin | 248/162.1 |
| 6,997,422 | B2 * | 2/2006 | Sweere et al. | 248/123.11 |
| 7,694,920 | B2 * | 4/2010 | Lien et al. | 248/125.8 |
| 2002/0088910 | A1 * | 7/2002 | Sweere et al. | 248/286.1 |
| 2004/0004165 | A1 | 1/2004 | Hong et al. | |

FOREIGN PATENT DOCUMENTS

| | | |
|---|---|---|
| CN | 1467753 A | 1/2004 |
| JP | 3063920 U | 12/1999 |

* cited by examiner

*Primary Examiner* — Gwendolyn W Baxter
(74) *Attorney, Agent, or Firm* — Altis Law Group, Inc.

(57) ABSTRACT

An exemplary flat panel display (200) includes a display body (21) and a height adjusting member (23). The height adjusting member includes a supporting member (25) and a base (26). The supporting member includes a slider (30) and a sidewall (272). The slider is attached to the display body, and the slider abuts against but is slidable up and down along the sidewall. The slider is configured to be adjustable to vary an amount of friction between the slider and the sidewall such that a height of the display body is adjustable by applying external force to the display body and moving the display body to a new height.

17 Claims, 6 Drawing Sheets

FLAT PANEL DISPLAY HAVING HEIGHT ADJUSTING MEMBER

CROSS-REFERENCE TO RELATED APPLICATION

This application is related to, and claims the benefit of, a foreign priority application filed in China as Serial No. 200710073755.4 on Mar. 30, 2007. The related application is incorporated herein by reference.

FIELD OF THE INVENTION

The present invention relates to flat panel displays, and more particularly to a flat panel display having a height adjusting member. The height adjusting member is configured for adjusting a height of a display body of the flat panel display.

GENERAL BACKGROUND

Flat panel displays are widely used due to their advantages such as portability, low power consumption, and low radiation.

Figure 6:
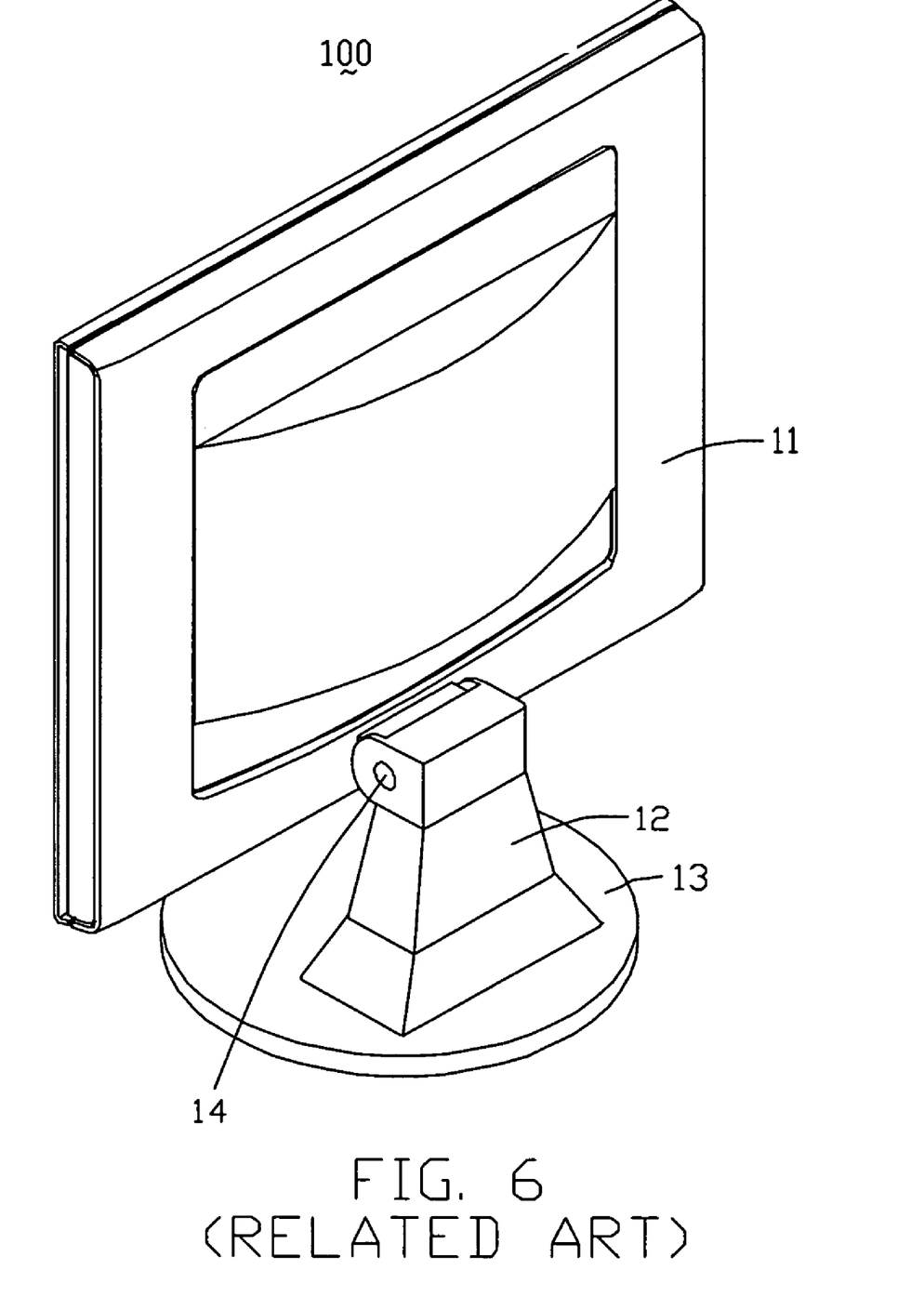
FIG. 6 is a rear, isometric view of a conventional flat panel display.

FIG. 6 is a rear, isometric view of a conventional flat panel display. The flat panel display 100 includes a display body 11, a supporting member 12, and a base 13. The supporting member 12 is integrally formed with the base 13, and is configured for supporting the display body 11. The display body 11 is engaged with the supporting member 12 via a pivot axis 14, such that the display body 11 can be rotated about the pivot axis 14.

It is widely held that a healthy position for a user to view a screen of the display body 11 is such that a horizontal centerline of the display body 11 is slightly below a horizontal line of sight of the user. In the flat panel display 100, however, a height of the display body 11 is determined by a size of the supporting member 12, and is essentially not adjustable. If the height of the display body 11 is not suitable for a particular user, he or she may have to resort to adjusting a height of his or her chair so as to obtain a healthy viewing position. This can be troublesome and time-consuming for the user.

It is, therefore, desired to provide a flat panel display that can overcome the above-described deficiencies.

SUMMARY

In one aspect, a flat panel display includes a display body and a height adjusting member. The height adjusting member includes a supporting member and a base. The supporting member includes a slider and a sidewall. The slider is attached to the display body, and the slider abuts against but is slidable up and down along the sidewall. The slider is configured to be adjustable to vary an amount of friction between the slider and the sidewall such that a height of the display body is adjustable by applying external force to the display body and moving the display body to a new height.

In another aspect, a flat panel display includes a display body and a height adjusting member. The height adjusting member includes a supporting member and a base. The supporting member includes a slider and a sidewall. The display body is slidably engaged to the base via the slider. The slider and the sidewall cooperatively provide variable friction for the slider to realize an adjustable height of the display body, and the amount of friction is determined by at least a distance between the slider and the base.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
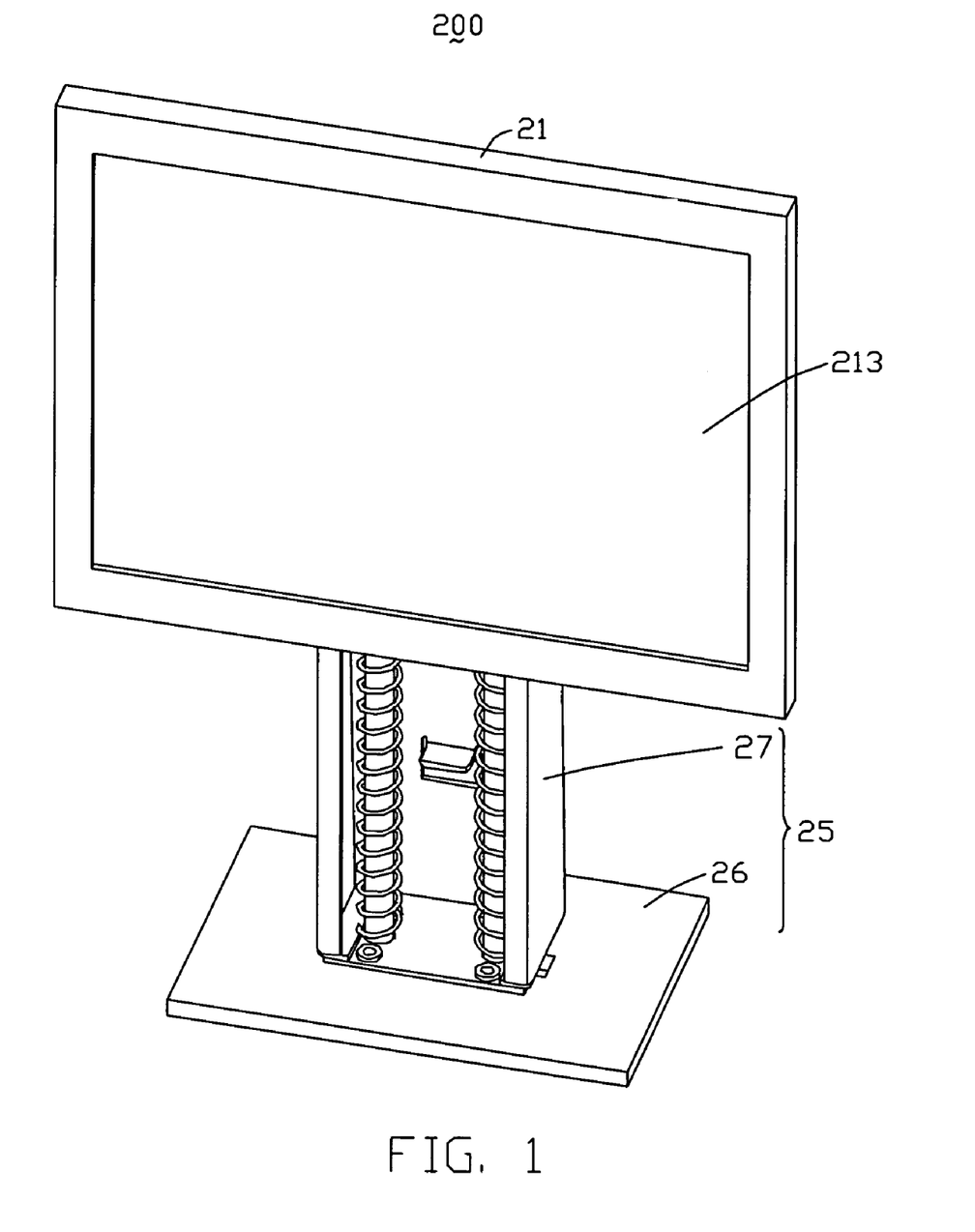
FIG. 1 is a front, isometric view of a flat panel display according to an exemplary embodiment of the present invention, the flat panel display including a height adjusting member.
Figure 2:
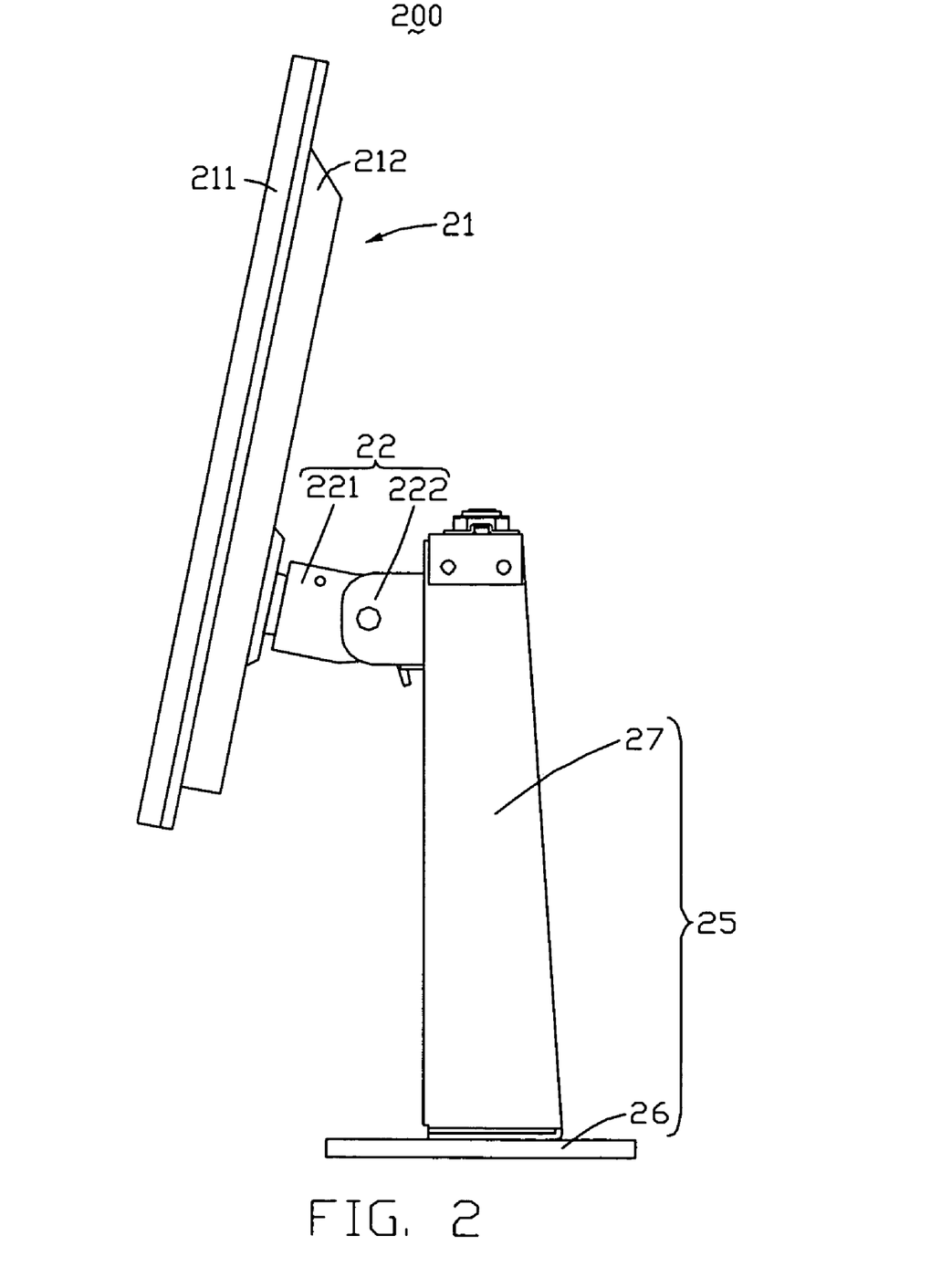
FIG. 2 is a right side, plan view of the flat panel display of FIG. 1.

Referring to FIGS. 1-2, a flat panel display 200 according to an exemplary embodiment of the present invention is shown. The flat panel display 200 includes a display body 21, an engaging member 22, and a height adjusting member 25. The height adjusting member 25 is configured for adjusting a height of the display body 21, and includes a supporting member 27 and a base 26.

The display body 21 includes a front frame 211, a back shell 212, and a display panel 213. The front frame 211 and the back shell 212 cooperatively form an accommodating space (not shown). The accommodating space is configured for receiving the display panel 213.

The engaging member 22 includes a first engaging portion 221 configured to engage with the display body 21, and a second engaging portion 222 configured to engage with the supporting member 27. The first engaging portion 221 is pivotally attached to the second engaging portion 222 via a pivot axle (not labeled). Thereby, the display body 21 is able to rotate via the engaging member 22, such that a display screen of the display panel 213 can be adjusted to a desired angle relative to a horizontal surface on which the flat panel display 200 is supported.

Figure 3:
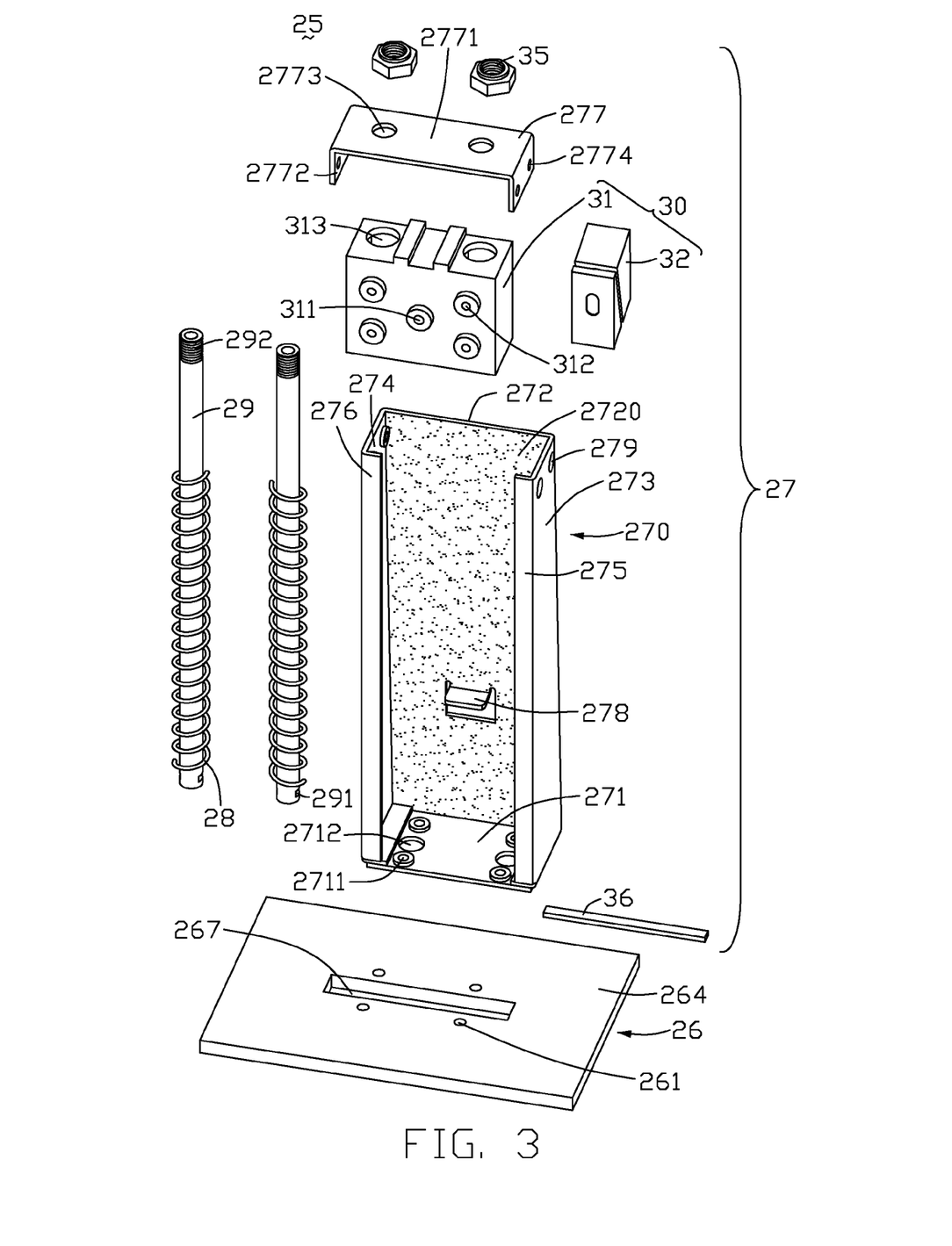
FIG. 3 is an exploded view of the height adjusting member of the flat panel display of FIG. 1, the height adjusting member including a sliding block.

Also referring to FIG. 3, the base 26 includes a main body 264, a slot 267, and four first fixing holes 261. The main body 264 is in the shape of a rectangular flat plate. The slot 267 is in the middle of the main body 264, parallel to long edges of the main body 264. Two of the first fixing holes 261 are disposed at one side of the slot 267, and are aligned parallel to the slot 267. The other two of the first fixing holes 261 are disposed at an opposite side of the slot 267, and are aligned parallel to the slot 267.

The supporting member 27 includes a supporting shell 270, a pair of first elastic members 28, a pair of supporting posts 29, a slider 30, a pair of fixing nuts 35, and a locking pin 36.

The supporting shell 270 includes a top wall 277, a bottom wall 271, a first sidewall 272, a second sidewall 273, and a third sidewall 274. The top wall 271, the first sidewall 272, the second sidewall 273, and the third sidewall 274 are formed integrally as a one-piece structure. The top wall 277 is detachable from the one-piece structure, and includes a main plate 2771 and a pair of first flanges 2772. The main plate 2771 includes a pair of first through holes 2773. Each of the first through holes 2773 corresponds to a supporting post 29, and is configured for positioning the corresponding supporting post 29. One of the first flanges 2772 extends down from an end of the main plate 2771, and the other first flange 2772 extends down from an opposite end of the main plate 2771. Each first flange 2772 includes a pair of second fixing holes 2774 configured to provide fixing of the top wall 277 to the one-piece structure.

The bottom wall 271 includes a pair of second through holes 2712 and four first screw holes 2711. The second through holes 2712 are aligned substantially along a central long axis of the bottom wall 271. Each second through hole 2712 corresponds to one of the supporting posts 29. The first screw holes 2711 are arrayed in positions corresponding to the first fixing holes 261 of the base 26, such that each first screw hole 2711 can be aligned with a respective first fixing hole 261.

The first sidewall 272 extends from a back edge of the bottom wall 271, and is configured as a friction wall. In particular, an inner surface 2720 of the first sidewall 272 is roughened to have a large friction coefficient µ. The roughened inner surface 2720 can be obtained via rubbing or providing an antiskid tape thereon. The first sidewall 272 includes a blocking piece 278. The blocking piece 278 extends perpendicularly forward from a generally central portion of the first sidewall 272. The blocking piece 278 serves as a stopper, and is used to restrict a sliding range of the slider 30.

The second sidewall 273 is in the shape of a right-angled trapezoid, and integrally extends forward from a side edge of the first sidewall 272. A bottom end of the second sidewall 273 adjoins the bottom wall 271, and is slightly longer than a top end of the second sidewall 273. An elongate second flange 275 integrally extends inward from a front edge of the second sidewall 273, and is opposite to the first sidewall 272.

The third sidewall 274 is opposite to the second sidewall 273, and has a shape and a size similar to the second sidewall 273. Thereby, the one-piece structure has the shape of a hollow, truncated wedge, which gradually tapers with increasing distance away from the bottom wall 271. In detail, the third sidewall 274 integrally extends forward from an opposite side edge of the first sidewall 272. An elongate third flange 276. The third flange 276 integrally extends inward from a front edge of the third sidewall 273, and is opposite to the first sidewall 272. Each of the second and third sidewalls 273, 274 includes a pair of second screw holes 279. Each pair of second screw holes 279 is disposed adjacent to the top end of the corresponding second or third sidewall 273, 274. Each of pair of second screw holes 279 corresponds to the second fixing holes 2774 of the corresponding first flange 2772.

Each of the supporting posts 29 is a solid, elongate column, and can be made of material such as metal or alloy. Each supporting post 29 includes a top screw thread 292 and a bottom pinhole 291. The screw thread 292 corresponds to one of the fixing nuts 35. The pinhole 291 can receive the locking pin 36 therethrough. The locking pin 36 is elongate, and can be received in the slot 267 of the base 26.

The first elastic members 28 can both be coil springs. Each of the first elastic members 28 corresponds to a supporting post 29, and has an inner diameter slightly greater than a diameter of the supporting post 29. Thereby, the first elastic member 28 can be fitted around the supporting post 29.

The slider 30 includes an attaching portion 31 and a sliding block 32. The attaching portion 31 has a hollow box-like structure, and the sliding block 32 can be received in the attaching portion 31. A front wall of the attaching portion 31 includes a third screw hole 311 and four fourth screw holes 312. The fourth screw holes 312 are configured to provide fixing of the slider 30 to the second engaging portion 222, and are arranged in the form of a rectangle. The third screw hole 311 is located in a center of the rectangle. An upper wall and a lower wall of the attaching portion 311 each include a pair of third through holes 313. The supporting posts 29 can be inserted through the attaching portion 31 via the third through holes 313.

Figure 4:
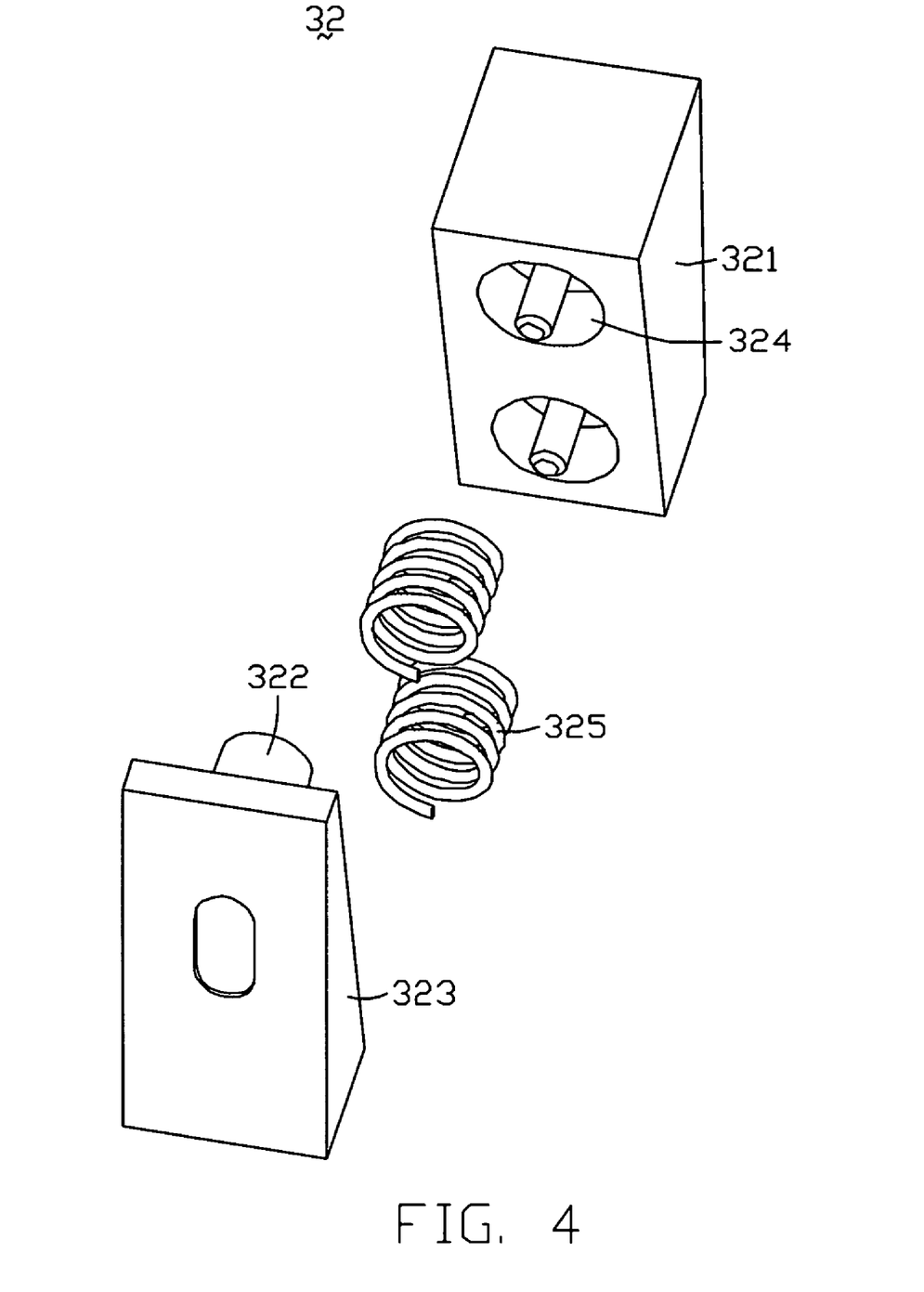
FIG. 4 is an enlarged, exploded view of the sliding block of FIG. 3.

Also referring to FIG. 4, the sliding block 32 includes a front portion 323, a rear portion 321, and a pair of second elastic members 325. Each of the front portion 321 and the rear portion 323 has a generally truncated wedge shape. The rear portion 321 is configured to slide along the first sidewall 272, and includes a pair of annular grooves 324. The front portion includes a pair of protrusions 322. The second elastic members 325 can both be coil springs, and are fitted around the protrusions 322 respectively. Each protrusion 322 together with the corresponding elastic member 325 can be received in one of the grooves 324. An uncompressed length of each second elastic member 325 is greater than a depth of the groove 324.

Figure 5:
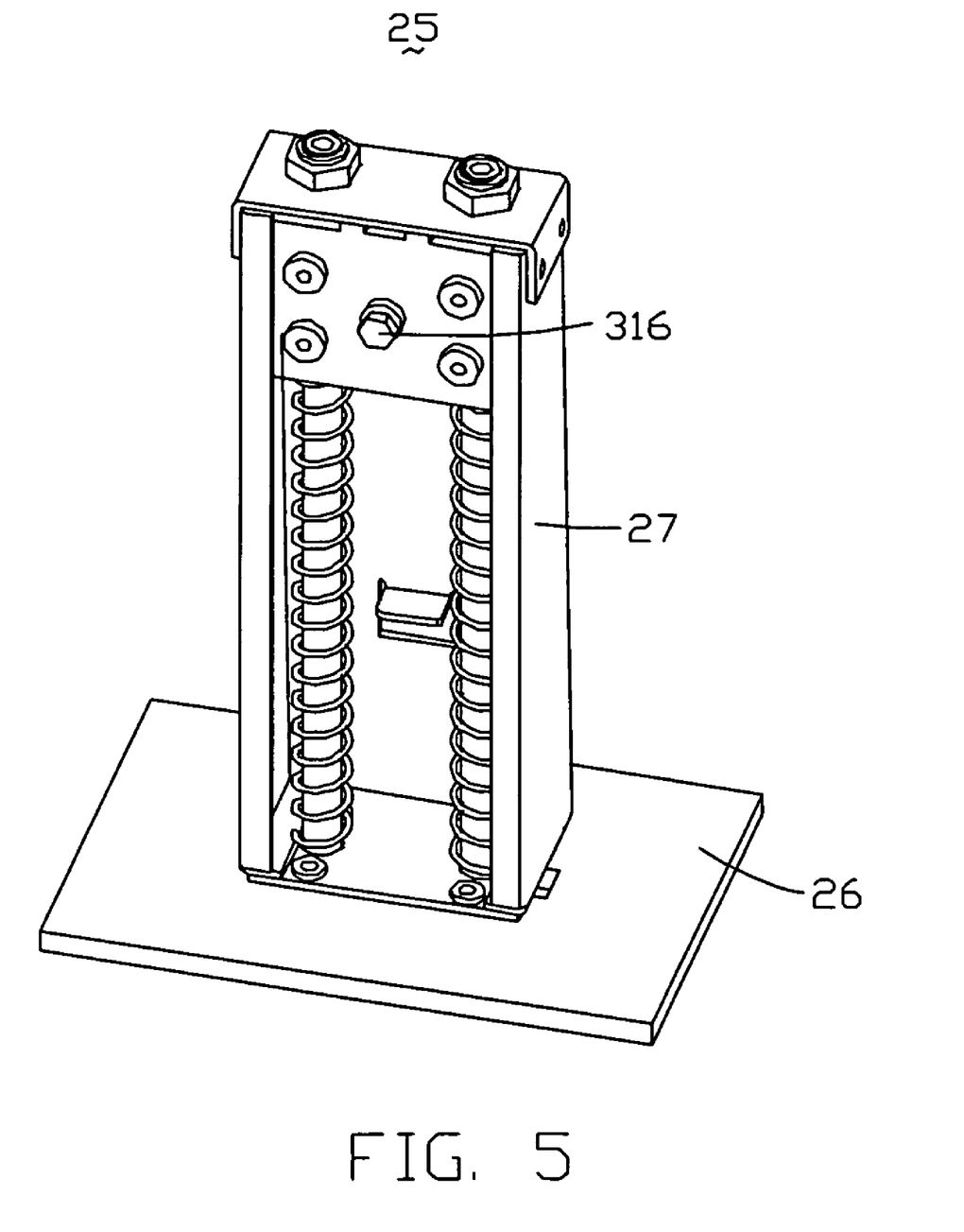
FIG. 5 is an assembled view of the height adjusting member of FIG. 3.

Also referring to FIG. 5, in assembly, firstly, the supporting posts 29 are respectively inserted through the first through holes 2712 of the bottom wall 271. The locking pin 36 pins are inserted through the pinholes 291 of the supporting posts 29, below the bottom wall 271. Thereby, the supporting posts 29 are positioned in the one-piece structure. The first elastic members 28 are then fitted around the corresponding supporting posts 29.

Secondly, the one-piece structure is positioned on the base 26, such that the locking pin 36 is received in the slot 267, and the first screw holes 2711 are aligned with the corresponding first fixing holes 261. Thereafter, a plurality of fasteners such as screw bolts are respectively inserted through the first fixing holes 261 and engaged in the first screw holes 2711. Thus the one-piece structure is firmly fixed to the base 26.

Thirdly, the front portion 323 and the rear portion 321 of the sliding block 32 are attached to each other, so that the second elastic members 325 are received in the corresponding grooves 324. Then the sliding block 32 is placed in the attaching portion 31. The front portion 323 and the rear portion 321 are squeezed together. The attaching portion 31 with the sliding block 32 is received in the one-piece structure, with the supporting posts 29 being received through the third through holes 313. In this position, the slider 30 rests on the first elastic members 28, and the first elastic members 28 exert vertical resistance on the slider 30.

Because the uncompressed length of each second elastic member 325 is greater than the depth of the corresponding groove 324, the second elastic members 325 are both compressed and elastically urge the first sidewall 272. An adjusting bolt 316 is then provided and screwed into the third screw hole 311, with a free end of the adjusting bolt 316 abutting against the front portion 323 of the sliding block 32. Thus, a degree of compression of the second elastic members 325 is determined by how far the adjusting bolt 316 extends inside the attaching portion 31, and by a vertical location of the slider 30 along the tapered channel of the one-piece structure. The compressed second elastic members 325 cause the rear portion 321 of the slider 30 to exert horizontal elastic force on the first sidewall 272, and the horizontal elastic force can be adjusted by turning the adjusting bolt 316 until it reaches a desired position. Friction force F between the slider 30 and the first sidewall 272 is determined by the follow formula: $F=\mu N$, where µ represents the friction coefficient of the first sidewall 272, and N represents the force exerted by the slider 30 on the first sidewall 272. N is essentially equal to the horizontal elastic force exerted by the second elastic members 325. Accordingly, the friction force F is adjustable by adjusting the value of N.

Fourthly, the top wall 277 is positioned to cover the one-piece structure, with the second fixing holes 2774 being aligned with the corresponding second screw holes 279. In addition, the supporting posts 29 are received through the first through holes 2773, with the screw threads 292 being exposed above the top wall 277. The fixing nuts 35 are then engaged on the screw threads 292. A plurality of fasteners such as screw bolts are inserted through the second fixing holes 2774 and engaged in the second screw holes 279, such that the top wall 277 is fixed to the one-piece structure. Thereby, the height adjusting member 25 is assembled, and the slider 30 can move in the channel between the top wall 277 and the blocking piece 278 inside the supporting shell 270.

Finally, the display body 21 is attached to the height adjusting member 25 via the engaging member 22. Gravitational force of the display body 21 is balanced by vertical elastic force exerted by the compressed first elastic members 28 on the attaching portion 31 of the slider 30, and by the friction force F between the slider 30 and the first sidewall 272. Thereby, the display body 21 can stay in position at a desired height above the base 26. Moreover, the position of the display body 21 can be adjusted by turning the adjusting bolt 316 to obtain a desired friction force F.

With this configuration, if the present height of the display body 21 is not suitable for a particular user, the display body 21 can be adjusted to a new desired position via the height adjusting member 25. The desired position can, for example, be such that a horizontal centerline of the display body 21 is slightly below a horizontal line of sight of the user.

In particular, when the display body 21 is raised, external force can be applied by a user to pull the display body 21 upward. Thereby, the display body 21 together with the slider 30 moves upward along the supporting posts 29. Due to the rising of the slider 30, the degree of compression of the first elastic members 28 is reduced. Therefore the vertical elastic force exerted by first elastic members 28 for supporting the display body 21 is reduced. However, because the one-piece structure is tapered, the degree of compression of the second elastic members 325 increases. That is, the horizontal elastic force N exerted on the first sidewall 272 by the compressed second elastic members 325 is increased. Accordingly, the friction force F between the slider 30 and the first sidewall 272 is also increased. The increase of the friction force F counteracts the reduction in the vertical elastic force exerted by first elastic members 28. Therefore when the external force applied by the user is removed, the gravitational force of the display body 21 can be balanced by the vertical elastic force exerted by the first elastic members 28 and the friction force F between the slider 30 and the first sidewall 272, such that the display body 21 securely stays in the adjusted higher position.

Similarly, the display body 21 can be lowered by a user applying external force and pushing (or pulling) the display body 21 down. When the display body 21 is in a lower position, the vertical elastic force exerted by the first elastic members 28 is increased, and the friction force F between the slider 30 and the first sidewall 272 is reduced due to the reduction in the degree of the deformation of the second elastic members 325. Thereby, when the external force applied by the user is removed, the display body 21 can securely stay in the adjusted lower position.

In summary, the height adjusting member 25 employed in the flat panel display 200 enables the display body 21 to be moved vertically to a desired height. Thereby, if the present height of the display body 21 is not suitable for a particular user, the display body 21 can be moved up or down by way of the user exerting external force on the display body 21. Because the supporting member 27 is shaped as a gradually tapering truncated wedge, when the height of the display body 21 is adjusted, the friction force F between the slider 30 and the first sidewall 272 changes correspondingly, so as to balance the change in the vertical elastic force exerted by the first elastic members 28. Thereby, when the user's external force is removed, the display body 21 can securely stay in the new desired position. Adjusting the height of the display body 21 of the flat panel display 200 is convenient and reliable.

It is to be understood that even though numerous characteristics and advantages of preferred and exemplary embodiments have been set out in the foregoing description, together with details of the structures and functions of the embodiments, the disclosure is illustrative only; and that changes may be made in detail within the principles of present invention to the full extent indicated by the broad general meaning of the terms in which the appended claims are expressed.

What is claimed is:

1. A flat panel display, comprising:
a display body; and
a height adjusting member comprising a supporting member and a base;
wherein the supporting member comprises a slider, a sidewall, a first elastic member and a supporting post, the first elastic member is a spring disposed between the base and the slider, and exerts an upward elastic force on the slider, the supporting post extends through the slider such that the slider is slidable up and down along the supporting post, and the first elastic member is located around the supporting post, the slider is attached to the display body, and the slider abuts against but is slidable up and down along the sidewall, the slider is configured to be adjustable to vary an amount of friction between the slider and the sidewall such that a height of the display body is adjustable by applying external force to the display body and moving the display body to a new height.

2. The flat panel display as claimed in claim 1, wherein the amount of friction increases when the distance between the slider and the base increases, and the amount of friction decreases when the distance between the slider and the base decreases.

3. The flat panel display as claimed in claim 1, wherein a surface of the sidewall against which the slider abuts is rough.

4. The flat panel display as claimed in claim 3, wherein the surface of the sidewall against which the slider abuts comprises an antiskid tape.

5. The flat panel display as claimed in claim 1, wherein the supporting member has a generally tapered wedge configuration.

6. The flat panel display as claimed in claim 1, wherein the supporting member gradually tapers from bottom to top.

7. The flat panel display as claimed in claim 1, wherein the slider comprises an attaching portion and a sliding block, the attaching portion is attached to the display body, and the sliding block abuts against but is slidable up and down along the sidewall.

8. The flat panel display as claimed in claim 7, wherein the attaching portion is hollow, and the sliding block is received in the attaching portion.

9. The flat panel display as claimed in claim 7, wherein the sliding block comprises a second elastic member, and the second elastic member exerts horizontal elastic force such that the sliding block abuts against but is slidable up and down along the sidewall.

10. The flat panel display as claimed in claim 9, wherein the second elastic member is a spring.

11. The flat panel display as claimed in claim 9, wherein the sliding block further comprises a first portion and a second portion, and the second elastic member is in a compressed state between the first portion and the second portion.

12. The flat panel display as claimed in claim 11, wherein the first portion comprises a protrusion, the second portion comprises a groove, the second elastic member is located around the protrusion, and the second elastic member and the protrusion are at least partly received in the groove and movable in the groove.

13. The flat panel display as claimed in claim 12, wherein the slider further comprises an adjusting piece movable relative to the first portion, and when the adjusting piece is manipulated by a user, an amount of deformation of the second elastic member is adjusted to a desired amount.

14. The flat panel display as claimed in claim 13, wherein the attaching portion includes a receiving hole, the adjusting piece is inserted through the receiving hole, with a free end thereof abutting against the first portion.

15. The flat panel display as claimed in claim 1, wherein the supporting member further comprises a top wall, and the sidewall further comprises a blocking piece extending therefrom, and the top wall and the blocking piece cooperatively define a channel for the slider to slide along the sidewall.

16. A flat panel display, comprising:
a display body; and
a height adjusting member having a supporting member and a base;
wherein the supporting member comprises a slider and a sidewall, the slider is attached to the display body, the sidewall is mounted on the base, the sidewall comprises two opposite surfaces, the slider is sandwiched between the opposite surfaces and slidable along the opposite surfaces, and the distance between the opposite surfaces is gradually reduced so as to apply gradually stronger friction forces to the slider when the slider slides along a direction away from the base, the slider comprises a first portion, a second portion, a first elastic member and a second elastic member, the first portion and the second portion are separated from each other, the first portion is attached to the display body, and the second portion abuts against but is slidable along the sidewall in the direction away from the base and in a direction toward the base, with the first elastic member being compressed between the first portion and the second portion, and the second elastic member being compressed between the base and the slider to exert an elastic force on the slider in the direction away from the base.

17. The flat panel display as claimed in claim 16, wherein the elastic force provided by the first elastic member is perpendicular to the elastic force provided by the second elastic member.

* * * * *